United States Patent [19]

Ueno

[11] Patent Number: 4,755,703
[45] Date of Patent: Jul. 5, 1988

[54] ELECTRIC MOTOR
[75] Inventor: Kazuo Ueno, Chita, Japan
[73] Assignee: Aichi Tokei Denki Co., Ltd., Aichi, Japan
[21] Appl. No.: 27,387
[22] Filed: Mar. 18, 1987
[30] Foreign Application Priority Data Mar. 19, 1986 [JP] Japan ................. 61-062723

[51] Int. Cl.$^4$ .............. H02K 1/02; H02K 37/04; H02K 37/08
[52] U.S. Cl. ................ 310/184; 310/12; 310/49 R; 310/155; 310/156
[58] Field of Search ............ 310/46, 152, 155, 268, 310/12, 44, 49 R, 156, 180, 184, 185

[56] References Cited

U.S. PATENT DOCUMENTS 3,230,406  1/1966  Henry-Baudot ............ 310/268 X
3,869,626  3/1975  Puttock ................. 310/268 X
4,087,709  5/1978  Haydon ................. 310/156

Primary Examiner—Mark O. Budd
Assistant Examiner—Judson H. Jones
Attorney, Agent, or Firm—Armstrong, Nikaido, Marmelstein & Kubovcik

[57] ABSTRACT

The invention relates to improvement of a motor with a rotor including a permanent magnet. The motor comprises a yoke of soft magnetic material, a plurality of field poles each having a field core of semi-hard magnetic material and a pole piece of soft magnetic material, a plurality of coils wound around the field cores respectively, and a rotor including a permanent magnet. In this constitution, utilizing action of the minor loop of the field cores of semi-hard magnetic material, the residual magnetic flux density of the plurality of field cores is controlled in sequence and the shifting magnetic field is induced thereby the magnetic poles of the rotor are attracted in sequence so as to move the rotor.

9 Claims, 4 Drawing Sheets

ELECTRIC MOTOR

BACKGROUND OF THE INVENTION

1. Field of the Invention

The present invention relates to the improvement of an electric motor having a moving part made up of a permanent magnet; the electric motor is used for driving or positioning various kinds of industrial machinery, that is, the construction machinery, processing machinery, OA instruments, machine tools, and precision instruments and so forth.

2. Description of the Prior Art

A conventional electric motor, for instance, is equipped with a rotor which is mounted on a frame by means of an axle so as to revolve freely and also is made of a permanent magnet that is magnetized in a diametrical direction, and with a stator which forms, in a concentric way with the rotor, the outer circumference of the rotor, and which is provided with field poles standing out on its surface and having equal spaces in the direction of the circumference of the yoke, and each of the field poles has a coil wound around it. The yoke and the field pole are each made of soft magnetic material or, alternatively the yoke and the field pole are combined into a monolithic part, also being made of soft magnetic material.

This kind of the electric motor is given a one-step turn in the regular direction by attracting the magnetic pole of the rotor to the magnetic field of the field pole excited by the excitation of the coil, and thereafter the excited coil is made free from excitation, causing the next coil in the revolving direction to be excited in turn so as to attract the magnetic pole of the rotor to the magnetic field of the field pole, giving another one-step turn. In this way the production of the shifting magnetic field around the field pole by exciting each of the coils in regular turn enables the rotor to revolve continuously.

Furthermore when the rotor is required to stop in a certain position which is decided previously, with respect to the conventional electric motor, a holding current flows in the coil in order to keep a rotor in a required position by the holding torque produced when attracting the magnetic pole of the rotor to the magnetic field of the magnetic pole.

The structure of the conventional electric motor, however, needs an exciting current which excites the field pole nearly up to the saturation range so as to produce the shifting magnetic field.

Also the structure of the conventional electric motor needs to keep the holding current flowing, when the rotor is required to stop in a position which is decided previously. Therefore, when the conventional electric motor sends power or moves an object to a regular position correctly, it needs an operating structure such as a ring of gears and a link mechanism.

SUMMARY OF THE INVENTION

An object of the invention is to provide an efficient electric motor, which turns the rotor by producing the shifting magnetic field and can hold the rotor by a large holding torque, even without the holding current, and also which has enough torque even at a lower speed and an ease of control of the moving speed of the rotor. The electric motor of this invention is characterized by the yoke being made of soft magnetic materials, plural magnetic poles each having a field core made of semi-hard magnetic material and a pole piece made of soft magnetic material, plural coils each of which is wound around a field core, and wherein the rotor includes a permanent magnet.

The electric motor of this invention produces a moving magnetic field at the pole pieces by controlling the residual magnetic flux density accompanying the magnetization of the field cores made of semi-hard magnetic material. The principle of control of the residual magnetic flux density will be explained referring to FIGS. 1-3.

FIG. 1 shows a magnetic circuit which comprises a field core 1 made of semi-hard magnetic material, pole pieces 2a, 2b connected to both ends of the field core 1, and a gap 4 formed between the pole pieces 2a, 2b. The semi-hard magnetic material of the field core 1 forms a B-H curve as shown in FIG. 2. When the magnetic field intensity is varied in the direction of plus (+) or minus (−) but not so much as to reach the saturation range, minor loops are drawn as shown in FIG. 2.

FIG. 3 shows the relation between the magnetic flux density B induced in the field core 1 and the magnetic field H applied to the field core 1 by the current I flowing in the coil 3. In FIG. 3, C6 indicates an operating straight line in the magnetic circuit in FIG. 1, showing the property decided mainly by the magnetic resistance in the gap 4, the length of the field core 1, and the cross-sectional area of the field core 1. Let the operating point be on the origin, if the current I=0. If the current I flows in the coil 3 and the magnetic field of positive direction is applied and then the current I is increased gradually, the operating line is shifted to the right gradually. The magnetic flux density induced in the field core 1 can be represented by the intersection of the B-H curve and the operating line. If the magnetic field H is induced until $Hc_1$, the operating point starts at the origin O and moves to the point $q_1$. Next, if the current I is made ±=0, the operating point stops at the point $P_1$ and the residual magnetic flux density $Br_1$ is induced in the field core 1. If the current I is increased further and the magnetic field is induced until $Hc_2$ and then the current I is returned to O, the operating point moves from the point $P_1$ to the point $q_2$ and then from the point $q_2$ to the point $P_2$ with the result that the residual magnetic flux $Br_2$ is produced in the field core 1. Then the operating line varies from C6 to C7 and from C7 to C6.

Thereafter everytime the magnetic field is impressed in sequence in $Hc_3$, $Hc_4$ in a similar manner to before, the residual magnetic flux is increased more and more as shown as $Br_3$, $Br_4$. In such condition as this, if similar procedure is done in $-Hc_6$, $-Hc_7$, $-Hc_8$, the residual magnetic flux density $Br_6$, $Br_7$, $Br_8$ corrsponding to the magnetic field is induced in the field core 1 respectively.

As above described, the residual magnetic flux density induced in the field core 1 can be controlled by the current I flowing in a pulse state in the coil 3 wound around the field core 1 made of semi-hard magnetic material.

By making use of the action of the minor loop of the semi-hard magnetic material, the residual magnetic flux density of the plural field cores is controlled in sequence and a shifting magnetic field is induced, thereby the poles of the rotor are attracted in sequence with the result that the rotor is moved. The stop position of the rotor is held by an attracting torque between the residual magnetic flux of the field core and the magnetic pole of the permanent magnet rotor which comes to a stop.

As above described, since the electric motor of a invention comprises a yoke of soft magnetic material, plural field poles each having a field core of semi-hard magnetic material which maintains a residual magnetic flux and the pole piece of soft magnetic material, and a rotor including a permanent magnet, the shifting magnetic field can be generated by making use of the action of the minor loop of the field core of semi-hard magnetic material, and efficiency as a motor becomes high because exciting current is not needed while the shifting torque of the rotor is produced. Moreover, since the rotor is held at the stop position by the residual magnetic flux of the field core when it comes to a halt, the holding current for holding the rotor is not required.

Furthermore, the electric pulse impressed to the coil is varied in size, width, frequency or the like, and thereby the shifting speed of the rotor can be easily controlled and the rotor can be stopped at any position.

The electric motor is driven at a low speed, thereby the low-speed operating energy can be gained directly from the electric energy without any energy loss due to a gear mechanism or the like.

DESCRIPTION OF THE PREFERRED EMBODIMENTS

Figure 4:
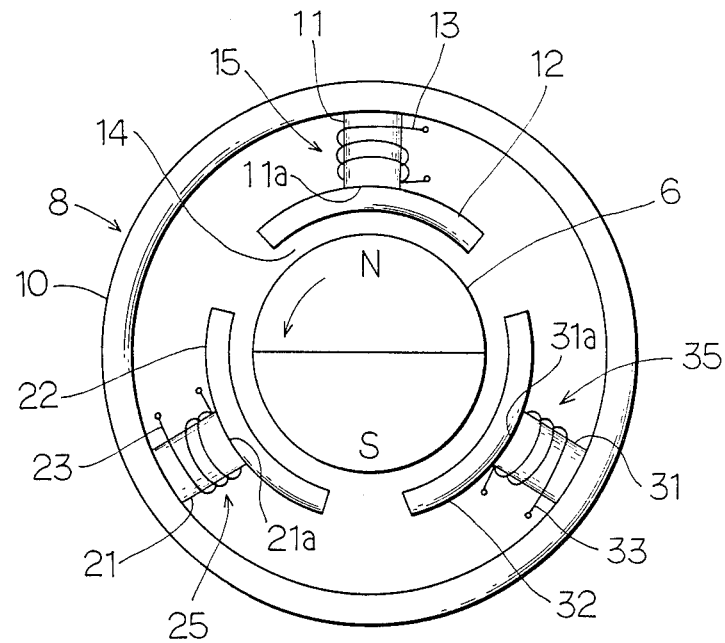
FIG. 4 is a front sectional view of an embodiment of the invention.

FIG. 4 is a front sectional view of a pulse motor being a kind of an electric motor as an embodiment of the invention. In FIG. 4, numeral 6 designates a rotor, and numeral 8 designates a stator.

(A) First Embodiment

The rotor 6 is a permanent magnet with two poles, N, S poles, confronting each other in the direction of a diameter. The stator 8 comprises a yoke 10 of soft magnetic material, and three field poles 15, 25, 35 projecting at intervals of 120 degrees for example.

The field poles 15, 25, 35 are composed of field cores 11, 21, 31, of semi-hard magnetic material, and pole pieces 12, 22, 32 of soft magnetic material installed on projecting ends 11a, 21a, 31a of the field cores 11, 21, 31 respectively.

A gap 14 of predetermined distance is formed between the pole pieces 12, 22, 32, and the rotor 6, and coils 13, 23, 33 are wound around the field cores 11, 21, 31 respectively.

The pulse motor shown in the embodiment is the same type as a conventional one, except that the field cores 11, 21, 31 are made of the semi-hard magnetic material.

Operation of the pulse motor in such structure will now be described.

In the state shown in FIG. 4, the rotor 6 is stopped and current does not flow in any of the coils 13, 23, 33. Therefore the magnetic flux induced by the rotor 6 enters from the N pole of the rotor 6 into the pole piece 12 of the field pole 15, and further passes through the field core 11 and the yoke 10. The magnetic flux is divided from the yoke 10 into the field cores 21, 31 and flows from the field core 21 to the pole piece 22 and from the field core 31 to the pole piece 32. The magnetic flux passes mostly from the pole pieces 22, 32 through the S pole of the rotor 6, thereby in this state the rotor 6 is balanced in torque.

Assume that the state where the N pole induced at the projecting end 11a of the field core 11 or the projecting end 21a of the field core 21 or the projecting end 31a of the field core 31 therefor denotes a state where the flux of the field cores 11, 21, 31 is induced as plus (+). Then in the situation in FIG. 4, as the pole piece 12 is made S pole, a negative flux is induced at the field core 11. Explaining this by FIG. 3, the situation is shown by any of the operating lines C11, C12, C13, C14. Likewise, as the pole piece 22 of the field pole 25 is made a N pole, the situation of the field core 21 is shown by any of the operating lines C7, C8, C9, C10. The field core 31 is in the same situation as that of the field core 21.

Figure 1:
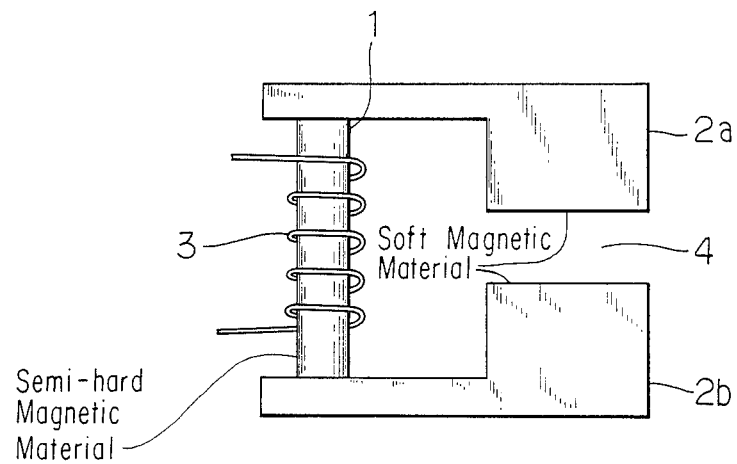
FIG. 1 is a view of a magnetic circuit including semi-hard magnetic material illustrating the principle of the invention.
Figure 2:
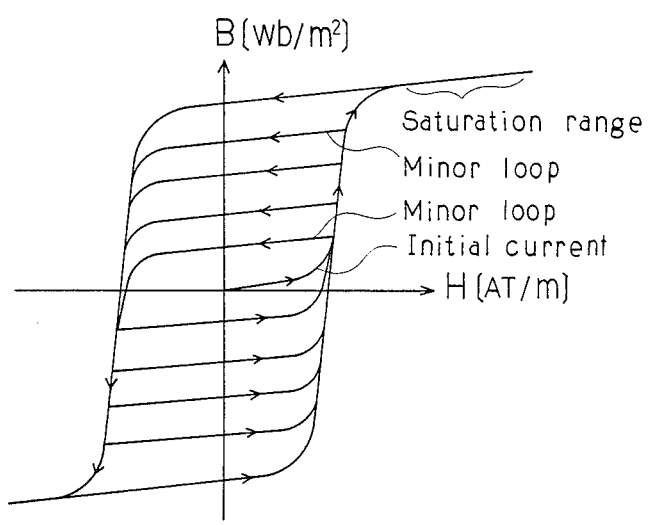
FIG. 2 is a graph of B-H curve of a the semi-hard magnetic material.
Figure 3:
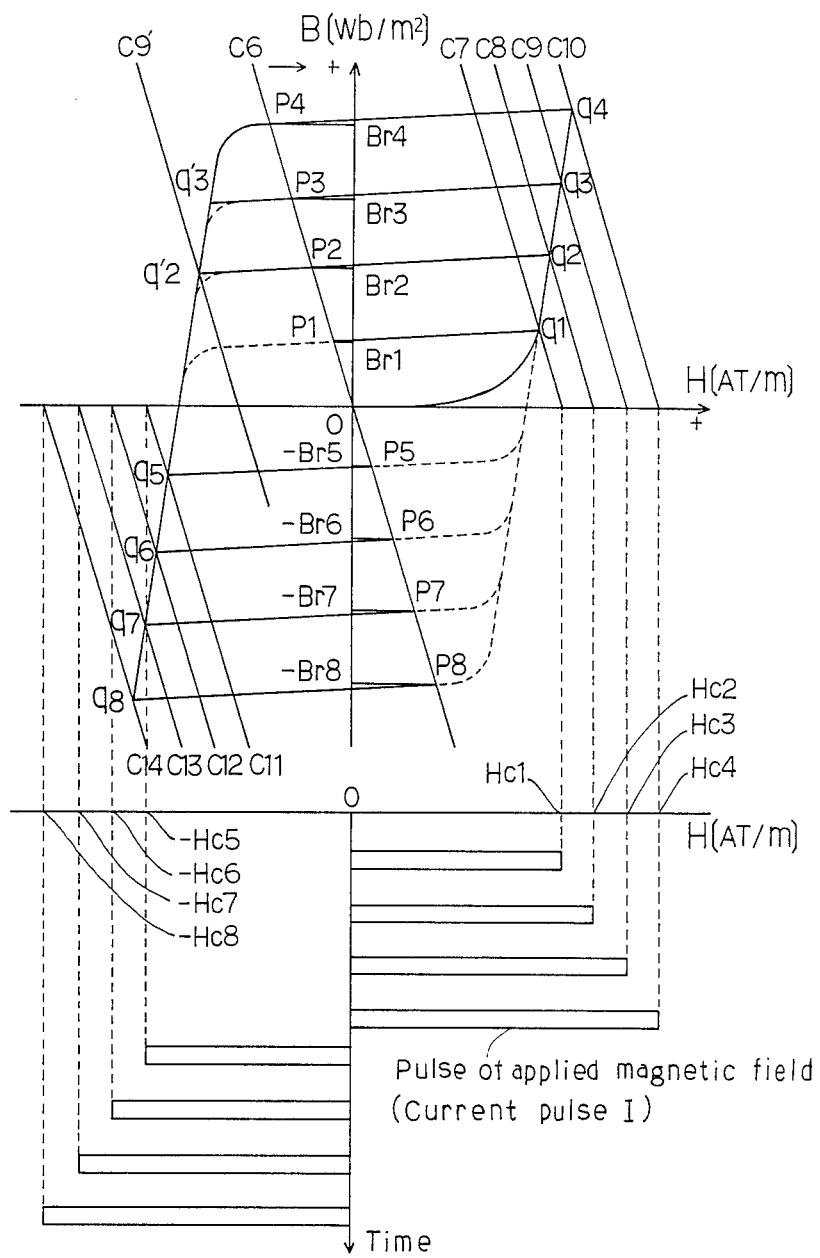
FIG. 3 is a graph of a B-H curve illustrating the relation between the excitation of the semi-hard magnetic material and the residual magnetic flux density.

In other words, the bias magnetic field is applied to each of the field cores 11, 21, 31 by the permanent magnet of the rotor 6. In FIG. 3, assume that the field core 11 is at situation of the intersection $q_8$ between the operating line C14 and the minor loop. Likewise, assume that the field cores 21 and 31 be at situation of the intersection $q_3$ between the operating line C9 and the minor loop. The reason for this assumption is that the field core 11 is just opposite to the N pole of the rotor 6 and biased most strongly and that the field cores 21, 31 are influenced a little by the N pole of the rotor 6 and therefore the bias of the S pole of the rotor 6 is not strong in comparison to the field core 11.

Next, with the field cores 11, 31 kept as they are, a pulse current flows in the coil 23 of the field core 21 thereby the flux induced in the field core 21 is decreased. In this case, the pulse current flows in the coil 23 of the field core 21 so that the operating line C9 is shifted to position of C9'. That is, the operating point is moved from $q_3$ to $q_{3'}$ and further to $q_{2'}$. Accompanying this, the flux density produced in the field core 21 is also decreased from $q_{3'}$ to $q_{2'}$, and the flux density of the N pole induced in the pole piece 22 is decreased. Thereby the rotor 6 is moved in the arrow direction because the rotor 6 is totally made out of balance. When the current in the coil 23 passes through the peak value and becomes zero, the bias of the field core 21 by the rotor 6 is weakened by the moving (rotation) and the operating point becomes the intersection $q_2$ between the operating line C8 and the minor loop, and as the balance is recovered the rotation of the rotor 6 ceases.

In this state, since the rotation of the rotor 6 is only a little, the bias of the field core 11 scarcely varies. However, since the pole piece 32 faces the S pole of the rotor 6 further, the bias of the field core 31 becomes slightly bigger. Thereby the operating point is moved from $q_3$ towards $q_4$.

When a pulse current flows in the coil 23 so as to decrease the magnetic flux density of the field core 21, the rotor 6 is further rotated according to the same principle as mentioned above. When the pulse is further impressed in similar manner, at last a reverse magnetic flux is induced at the field core 21. As a result, the N pole of the rotor 6 is attracted towards the pole piece 22. When the operating point of the field core 21 is moved from $q_7$ to $q_8$, the N pole of the rotor 6 overlaps with the pole piece 22 and the pole piece 12 thereby the pole piece 32 of the field core 31 comes to confront the S pole fully. The magnetic flux density of the field core 11 is weakened and made the reverse polarity at last. Next, when the magnetic flux density of the field core 31 is weakened, the rotor 6 is rotated also in the arrow direction. The magnetic flux density of a field core 31 is further weakened until the reverse magnetic flux density is produced. If the above-mentioned operations are done in a series, a rotor 6 is rotated in the arrow direction.

If the semi-hard magnetic material is used for the field core, the magnetic flux density of the stator can be controlled according to how an electric pulse is impressed, and therefore the operation of the rotor can be also controlled arbitrarily with the result that the forward and reverse rotation of the rotor and the rotational speed thereof can be controlled according to how an electric pulse is impressed. The electric pulse can be varied in relation to the interval and amplitude of the voltage source pulse and those of the current source pulse, and also in relation to the direction of (+), (−) of the power source. Besides, it can be varied in relation to pulse waveform and pulse frequency.

(B) Second Embodiment

Figure 5:
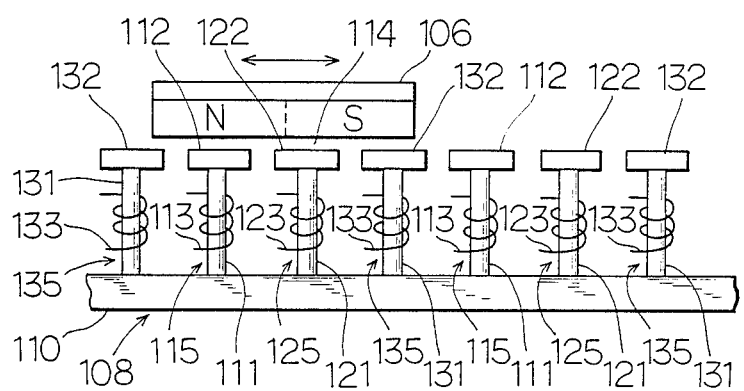
FIG. 5 is a front view of another embodiment.

FIG. 5 is a front view of an embodiment in which this invention is applied to a stroke moving body. The stroke moving body is a linear development of a stator and a rotor, and each component of the stroke moving body is similar to that of the first embodiment except for the linear constitution. Consequently, the reference numerals in the first embodiment can be all replaced by three-figure numerals in the second embodiment, and the detailed description shall be omitted here.

In the second embodiment, a linear stator 108 comprises a yoke 110 of soft magnetic material, and a plurality of field poles 115, 125, 135 arranged with prescribed intervals on the upper surface of the yoke 110. The field poles 115, 125, 135 are composed of field cores 111, 121, 131 of semi-hard magnetic material, and pole pieces 112, 122, 132 of soft magnetic material, respectively.

Coils 113, 123, 133 are wound around the field cores 111, 121, 131, respectively, and a moving part 106 is magnetized in such a way that the N and S poles confronts each other in the shifting direction. The moving part 106 keeps a prescribed distance from the pole pieces 112, 122, 132 so as to constitute a gap 114, and is supported to be movable in the longitudinal direction of the stator 108.

Pulse voltage is applied to the coils 113, 123, 133 in sequence, thereby the residual magnetic flux density of the field cores 111, 121, 131 is controlled and the moving magnetic field is induced on upper sides of the pole pieces 112, 122, 132 and the moving part 106 is moved linearly.

Figure 6:
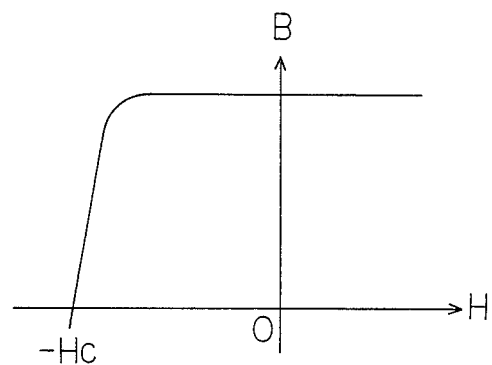
FIG. 6 is a graph of a B-H curve of semi-hard magnetic material applicable to the invention.

The above-mentioned semi-hard material takes the Hc value of several tens—several thousands e on the B-H curve shown in FIG. 6, and material of an Hc value of several hundreds or more can be applied if the shape is similar to that shown in FIG. 6. Material of an Hc value of several hundreds or more is called hard magnetic material in general, but material of the Hc value of about several hundreds can be applied as a field core in this invention.

Figure 7:
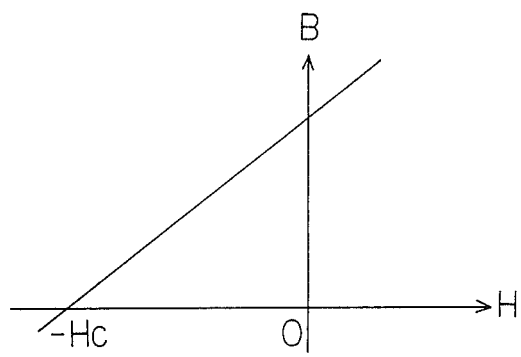
FIG. 7 is a graph of a B-H curve of hard magnetic material such as barium ferrite.

Barium ferrite and a magnet using rare earth elements having a B-H curve as shown in FIG. 7 cannot be utilized as the field core of the invention, because the utilization of the minor loop is difficult.

The invention is not restricted to the specific construction of the above-mentioned embodiments, but the embodiments may be modified without departing from the technical idea of the invention.

What is claimed is:

1. An electric step motor comprising:
   (a) a yoke composed of a soft magnetic material;
   (b) a plurality of field poles arranged on said yoke each comprising a field core composed of a semi-hard magnetic material and a pole piece composed of a soft magnetic material;
   (c) at least one coil means wound upon each of said cores for generating a magnetic flux therein so as to create a shifting magnetic field in said yoke in response to timed pulse voltages applied to said coil means; and
   (d) A movable member positioned adjacent to said pole pieces for movement with respect thereto and having a gap therebetween, said movable member including a permanent magnet member acting to position said movable member with respect to said yoke in accordance with said shifting magnetic field generated therein;
   (e) wherein a residual magnetic flux density of said field core semi-hard magnetic material due to most-recently applied pulse voltages causes said movable member to be retained in a stop position with respect to said yoke in the absence of further voltages applied to said coil means.

2. An electric motor as set forth in claim 1, wherein each pole piece comprises a partial circular shaped magnetism inducing member, and wherein one end of each of said field cores is connected to a corresponding pole piece and the other end of each of said field cores is connected to said yoke.

3. An electric motor as set forth in claim 2, wherein said movable member is a rotor and the gap between said rotor and each of said circular shaped magnetism inducing members is constant.

4. An electric motor as set forth in claim 3, wherein said field coils are excited by said timed pulse voltages in a predetermined sequence to thereby control the residual magnetic flux density of said field cores, and wherein the shifting of the magnetic field causes rotation of said rotor.

5. An electric motor as set forth in claim 1, wherein each pole piece comprises a linear shaped magnetism inducing member, and wherein one end of each of said field cores is connected to a corresponding pole piece and the other end of each of said field cores is connected to said yoke.

6. An electric motor as set forth in claim 5, wherein the gap between said rotor and each of said linear shaped magnetism inducing members is constant.

7. An electric motor as set forth in claim 6, wherein said field coils are excited in a predetermined sequence to thereby control the residual magnetic flux density of said field cores, and wherein the shifting of the magnetic field causes the linear movement of said rotor.

8. An electric step motor comprising:
   (a) a yoke composed of a soft magnetic material;
   (b) a plurality of field poles arranged on said yoke each comprising a field core composed of a semi-hard magnetic material and a pole piece composed of a soft magnetic material;

(c) at least one coil means wound upon each of said cores for generating a magnetic flux therein so as to create a shifting magnetic field in said yoke in response to timed pulse voltages applied to said coil means; and (d) a movable member positioned adjacent to said pole pieces for movement with respect thereto and having a gap therebetween, said movable member including a permanent magnet member acting to position said movable member with respect to said yoke in accordance with said shifting magnetic field generated therein;

(e) wherein said timed pulse voltages are applied to said coil means in sequence so as to control a residual magnetic flux density due to movement of a B–H minor loop of said semi-hard magnetic material of said core, and said shifting magnetic field is generated by the sum of residual magnetic flux fields of said field cores.

9. An electric step motor as recited in claim 8, wherein said movable member is moved in accordance with changes of said shifting magnetic field so long as said timed pulse voltages are applied to said coil means, and is retained in a position to which it has been moved by said residual magnetic flux when said timed pulse voltages are not applied.

* * * * *